(12) United States Patent
Kulkarni et al.

(10) Patent No.: US 8,990,765 B2
(45) Date of Patent: Mar. 24, 2015

(54) COMPUTATIONALLY EFFICIENT SYSTEM FOR DEVELOPING CONFIGURABLE, EXTENSIBLE BUSINESS APPLICATION PRODUCT LINES USING MODEL-DRIVEN TECHNIQUES

(75) Inventors: Vinay Kulkarni, Maharashtra (IN); Souvik Barat, Maharashtra (IN)

(73) Assignee: Tata Consultancy Services Limited (IN)

( * ) Notice: Subject to any disclaimer, the term of this patent is extended or adjusted under 35 U.S.C. 154(b) by 177 days.

(21) Appl. No.: 13/380,615

(22) PCT Filed: Aug. 31, 2010

(86) PCT No.: PCT/IN2010/000578
§ 371 (c)(1),
(2), (4) Date: Dec. 23, 2011

(87) PCT Pub. No.: WO2011/086571
PCT Pub. Date: Jul. 21, 2011

(65) Prior Publication Data
US 2012/0102451 A1   Apr. 26, 2012

(30) Foreign Application Priority Data
Jan. 13, 2010   (IN) .......................... 106/MUM/2010

(51) Int. Cl.
G06F 9/44        (2006.01)
(52) U.S. Cl.
CPC ..................................... *G06F 8/24* (2013.01)
USPC ........................................................ 717/102
(58) Field of Classification Search
CPC ....................................................... G06F 8/24
USPC ......................................................... 717/102
See application file for complete search history.

(56) References Cited

U.S. PATENT DOCUMENTS

| 5,864,862 | A  | * | 1/1999 | Kriens et al. | .......................... 1/1 |
| 6,467,085 | B2 | * | 10/2002 | Larsson | ....................... 717/165 |

(Continued)

OTHER PUBLICATIONS

Kulkarni et al., Generating enterprise applications from models—experience and best practices. Workshop on Best Practices of Model Driven Software Development at OOPSLA 2005 (Published 2005) retrieved from http://www.softmetaware.com/oopsla2005/kulkarni.pdf on Aug. 25, 2013.*

*Primary Examiner* — Don Wong
*Assistant Examiner* — Theodore Hebert
(74) *Attorney, Agent, or Firm* — Thompson Hine LLP

(57) ABSTRACT

The present invention provides a computationally efficient system for developing configurable, extensible business application product lines using model-driven techniques. The invention enables to create a common business application with a set of pre-defined variants, selection of a suitable variant from the pre-defined set, and composition of the common application with the selected variant into a purpose-specific business application and also provides for modeling of commonality and variability thus leading to a single specification. The invention provides model-based solution to address extensibility and configurability of both structural and behavioral aspects in a functionality dimension of database intensive business application and it supports configuration process at three different stages of application development (i.e. design time, installation time and run time) of database intensive business application. The invention reduces the cost as well as computational time for creating new business applications, and leads to effective maintenance and smooth evolution.

17 Claims, 8 Drawing Sheets

(56) References Cited

U.S. PATENT DOCUMENTS

| | | | |
|---|---|---|---|
| 7,019,740 B2* | 3/2006 | Georgalas | 345/418 |
| 7,650,592 B2* | 1/2010 | Eckels et al. | 717/125 |
| 2001/0034878 A1* | 10/2001 | Ahmavuo et al. | 717/1 |
| 2003/0028579 A1* | 2/2003 | Kulkarni et al. | 709/100 |
| 2004/0172623 A1* | 9/2004 | Eckels et al. | 717/125 |
| 2008/0082959 A1* | 4/2008 | Fowler | 717/104 |
| 2009/0300566 A1* | 12/2009 | Gee et al. | 716/7 |
| 2012/0102451 A1* | 4/2012 | Kulkarni et al. | 717/102 |

* cited by examiner

COMPUTATIONALLY EFFICIENT SYSTEM FOR DEVELOPING CONFIGURABLE, EXTENSIBLE BUSINESS APPLICATION PRODUCT LINES USING MODEL-DRIVEN TECHNIQUES

FIELD OF THE INVENTION

The present invention relates to developing database intensive business application product lines and in more particularly relates to a computationally efficient system and method for developing configurable, extensible database intensive business application business application product lines using model-driven technique.

PRIOR-ART REFERENCES

1) A Aho, R Sethi and J Ullman. Compilers: Principles, Techniques and Tools. Addison Wesley Publishing Company 1986.
2) Alexander Nyβen, Shmuel Tyszberowicz, Thomas Weiler. Are Aspects useful for Managing Variability in Software Product Lines? A Case Study. Early aspects workshop at SPLC 2005.
3) Alexandre Bergel, St'ephane Ducasse, and Oscar Nierstrasz. Classbox/J: Controlling the scope of change in Java. In Proceedings of Object-Oriented Programming, Systems, Languages, and Applications (OOPSLA'05), pages 177-189, New York, N.Y., USA, 2005. ACM Press.
4) A Goldberg, D Robson. Smalltalk-80: the language and its implementation. Addison-Wesley Longman Publishing Co., Inc. Boston, Mass., 1983.
5) Don Batory. Feature Models, Grammars, and Propositional Formulas. Software Productlines, Volume 3714 of LNCS, pages 7-20, Springer, 2005.
6) Felix Bachmann, Michael Goedicke, Julio Leite, Robert Nord, Klaus Pohl, Balasubramaniam Ramesh and Alexander Vilbig. A Meta-model for Representing Variability in Product Family Development. Software Product Family Engineering, volume 3014 of LNCS, pages 66-80, Springer, 2004.
7) Gregor Kiczales, John Lamping, Anurag Mendhekar, Chris Maeda, Cristina Videira Lopes, Jean-Marc Longtier and John Irwin. Aspect oriented programming. ECOOP'97 LNCS 1241, pp 220-242. Springer-Verlag. June 1997.
8) Hasan Gomaa, Diana L Webber. Modeling Adaptive and Evolvable Software Product Lines Using the Variation Point Model. Proceedings of the 37th Annual Hawaii International Conference on System Sciences (HICSS'04)—Track 9—Volume 9. Page: 90268.3
9) K. Czarnecki and M. Antkiewicz. Mapping features to models: A template approach based on superimposed variants. Generative Programming and Component Engineering, Volume 3676 of LNCS, pages 422-437. Springer, 2005.
10) M Clauβ, I Jena. Modeling variability with UML. GCSE 2001 Young Researchers Workshop, 2001
11) Nathaniel Nystrom, Xin Qi, and Andrew C. Myers, J&: Software Composition with Nested Intersection, OOPSLA 2006, pp. 21-36
12) Oscar Nierstrasz, Marcus Denker, Tudor Gîrba and Adrian Lienhard, "Analyzing, Capturing and Taming Software Change," Proceedings of the Workshop on Revival of Dynamic Languages (co-located with ECOOP'06), July 2006.
13) OSGi—The Dynamic Module System for Java, http://www.osgi.org/
14) Philip K. McKinley, Seyed Masoud Sadjadi, Eric P. Kasten, Betty H. C. Cheng, "Composing Adaptive Software," Computer, vol. 37, no. 7, pp. 56-64, July 2004
15) Robert Bruce Findler, Matthew Flatt, Modular object-oriented programming with units and mixins, Proceedings of the third ACM SIGPLAN international conference on Functional programming, p. 94-104, Sep. 26-29, 1998, Baltimore, Md., United States
16) T. Coupaye, J.-B. Stefani. Fractal Component-Based Software Engineering—Report on the Fractal workshop at ECOOP'06, 20th European Conference on Object-Oriented Programming (ECOOP 2006) Workshop Reader, LNCS 4379, 2007.
17) Vinay Kulkarni, R. Venkatesh and Sreedhar Reddy. Generating enterprise applications from models. OOIS'02, LNCS 2426, pp 270-279. 2002.
18) Vinay Kulkarni, Sreedhar Reddy, An abstraction for reusable MDD components: model-based generation of model-based code generators. GPCE 2008: 181-184
19) Vinay Kulkarni and Sreedhar Reddy, Separation of Concerns in Model-Driven Development. IEEE Software 20(5): 64-69 (2003)

BACKGROUND OF THE INVENTION

Business enterprises use IT systems as a mechanical advantage through automation of apriori well-defined repetitive operational tasks. With past dynamics of business being low, business applications were developed primarily to deliver certainty in a fixed operating environment. Advent of internet leading to increased connectivity within and amongst enterprises, and rapid evolution of technology platforms have contributed to significant increase in business dynamics in recent years. The increased dynamics puts new demands on businesses while opening up new opportunities that need to be addressed in an ever-shrinking time window. Stability and robustness seem to be giving way to agility and adaptiveness. This calls for a whole new perspective for designing (and implementing) IT systems so as to impart these critical properties.

Traditional business applications typically end up hard-coding the operating context in their implementation. As a result, adaptation to a change in its operating environment leads to opening up of application implementation. This adaptation process results in unacceptable responsiveness. It should be possible to configure a business application for the desired operating environment. New opportunities may put unconceived demands on business applications. It should be possible to quickly extend the existing implementation without breaking parts unrelated to the desired extension. It should be possible to support such adaptations at different levels of latency i.e. application design-time, application installation-time and application run-time. Moreover, large enterprises may want to impose some discipline in introducing such adaptations through, say, roles-n-responsibility structure.

Database intensive enterprise applications are realized conforming to distributed architecture paradigm that requires diverse set of technology platforms to implement. Such applications can be seen to vary along five dimensions, namely, Functionality (F), Business process (P), Design decisions (D), Architecture (A) and Technology platform (T).

A purpose-specific implementation makes a set of choices along the above mentioned dimensions, and encodes these choices, typically, in a scattered and tangled manner as mentioned in reference number 7 of the prior-art references. This scattering and tangling is the principal obstacle in agile adaptation of existing implementation for the desired change. Large size of enterprise application further exacerbates this problem. This is an expensive and error prone process demanding large teams with broad-ranging expertise in business domain, architecture and technology platforms. Model-driven development alleviates the problem somewhat by automatically deriving an implementation from its high-level specification as mentioned in reference number 17 of the prior-art references. Generation of model-based code generators from their high-level specifications further refines the solution as mentioned in reference number 18 of the prior-art references.

For identical business intent, different enterprises, even from the same business domain, may have different requirements along the above five dimensions—one can expect a significant overlap in their requirements and hence in specifications. Being ignorant of the similarities in such specifications would mean rework, and result in specification redundancy which will create maintenance and evolution problems later. Thus, it is important to capture commonality while highlighting the variability i.e. productline architecture as mentioned in reference number 9 of the prior-art references.

Specification-based development imparts adaptiveness, to a certain extent, especially with respect to technology platforms. The same business functionality can be delivered into a different set of choices of design decisions, architecture and technology platform through code generation—this is akin to retargetable code generation in compilers as mentioned in reference number 1 of the prior-art references.

However, imparting adaptation through code generation addresses the issue only in part as the 'adapted system' still needs to be compiled and deployed for execution. Thus, in specification-based development approaches, adaptiveness needs to be supported at various levels, namely, specification, code generation, code and deployment. Model-driven development aided by a code-generator product line imparts adaptiveness and variability with respect to D, A and T dimensions as mentioned in reference number 19 of the prior-art references.

However, change requests along D, A and T dimensions are relatively infrequent as compared to those along F and P dimensions. Ongoing dynamic middleware related work by OSGi community as mentioned in reference numbers 13 and 14 of the prior-art references which are aimed at addressing adaptiveness at deployment level.

The (de)composition mechanisms such as aspects as mentioned in reference number 7 of the prior-art references, mixins as mentioned in reference number 15 of the prior-art references, fractals as mentioned in reference number 16 of the prior-art references etc; variability management mechanisms such as feature models, and change specification languages such as ChangeBox as mentioned in reference number 12 of the prior-art references, ClassBox as mentioned in reference number 3 of the prior-art references, Jx/J& as mentioned in reference number 11 of the prior-art references are aimed at addressing adaptiveness at code level.

Some of the prior-arts known to us that address the problem of developing the database intensive business application product lines are:

U.S. Pat. No. 7,152,228 filed by Goodwin et al teaches that a method for generating source code objects has steps of generating a translation file containing translation logic; inputting the translation file into a code generator; and generating translation source code as a function of the translation file. A system for accessing a database through a translation layer comprising a first database; a translation layer, defined by translation source code; and an application for accessing the first database through the translation layer. But it fails to disclose the developing the database intensive business applications for two or more different enterprises from the same business domain from the common database intensive business application.

United States Publication Number 20080133303 filed by Singh et al teaches that a business object model, which reflects data that is used during a given business transaction, is utilized to generate interfaces. This business object model facilitates commercial transactions by providing consistent interfaces that are suitable for use across industries, across businesses, and across different departments within a business during a business transaction. But it fails to disclose the developing the database intensive business applications for two or more different enterprises from the same business domain from the common database intensive business application.

Kulkarni et al. in "Generating enterprise applications from models-experience and best practices" discloses about a family of tool-sets wherein each member takes one application specification as an input and gives implementation of that specification as an output in a particular architecture. Still it doesn't address the specification redundancy, while generating a set of closely related applications that leads to the maintenance and evolution problem.

Grady Booch in "The architecture of Web applications" teaches that a standard architecture for the web applications. The developed web application can be deployed on that standard architecture. But it fails to disclose the deployment of the developed database intensive business application in that standard architecture.

Rahul Mohan et al. in "Model Driven Development of Graphical user Interfaces for Enterprise Business applications a Experience, Lessons Learnt and a Way forward" discloses about applying model-driven techniques to build Graphical User Interfaces (GUI) of large enterprise business applications. The approach involves capturing various user interface patterns in the form of platform independent parameterized templates and instantiating them with relevant application data, serving as the template arguments. Models thus instantiated are translated to platform specific GUI implementation artifacts by a set of template-specific code generators. But it does not address the problem of specification redundancy, while generating a set of closely related application GUIs that leads to the maintenance and evolution problem.

Xuehong Du et al. in "Product family modeling and design support: An approach based on graph rewriting systems" discloses about a graph rewriting system to organize product family data according to the underpinning logic and to model product derivation mechanisms for product family design (PFD). It represents the structural and behavioral aspects of product families as family graphs and related graph operations, respectively. The derivation of product variants becomes a graph rewriting process, in which family graphs are transformed to variant graphs by applying appropriate graph rewriting rules. But it does not address the problem of specification redundancy, while generating a set of closely related applications that leads to the maintenance and evolution problem.

More particularly, the shortcomings with the prior arts are that the computational cost as well computational time is high for creating new database intensive business applications for different enterprises, even though from the same business domain. Yet another shortcoming with the prior arts is maintenance and evolution problems for creation of new database intensive business applications for different enterprises, even though from the same business domain due to significant overlap in their requirements and in specifications. Being ignorant of this overlap would mean rework, and result in specification redundancy. Yet another shortcoming with the prior arts are that they could not able provide a deployment framework for testing the developed database intensive business application.

Thus, in the light of the above mentioned prior art, it is evident that the computationally efficient system for developing configurable, extensible database intensive business application product lines for different enterprises, from the same business domain.

OBJECTIVES OF THE INVENTION

The principle objective of the present invention is to provide a computationally efficient system for developing configurable, extensible database intensive business application product lines using model-driven techniques.

Another significant objective of the invention is to provide for modeling of commonality and variability thus leading to a single database intensive business specification.

Another objective of the invention is to create a common database intensive business application with a set of pre-defined variants, selection of a suitable variant from the pre-defined set, and composition of the common database intensive business application with the selected variant into a purpose-specific database intensive business application.

Yet another objective of the invention is to provide a model-based solution to address extensibility and configurability of both structural and behavioral aspects in a functionality dimension of the database intensive business application.

Yet another objective of the invention is to reduce the cost as well as computational time for creating new database intensive business applications from a common database intensive business application and leads to effective maintenance and smooth evolution.

Further another objective of the invention is to provide a deployment framework for testing the developed database intensive business application.

A still another objective of the invention is to provide a component abstraction and an algebra that aids in imparting structural and behavioral properties of database intensive business application, and the component abstraction and the algebra are used to support the various adaptation operators in the database intensive business application.

Still further objective of the invention is to support configuration process at three different stages of application development (i.e. design time, installation time and run time) of the database intensive business application.

SUMMARY OF THE INVENTION

Before the present systems, and methods enablement are described, it is to be understood that this invention in not limited to the particular systems, and methodologies described, as these may vary. It is also to be understood that the terminology used in the description is for the purpose of describing the particular versions or embodiments only, and is not intended to limit the scope of the present invention which will be limited only by the appended claims.

The present invention provides a computationally efficient system for developing configurable, extensible database intensive business application product lines using model-driven techniques.

A computationally efficient system for developing configurable, extensible database intensive business application product lines using model driven technique, the said system comprises:
   a sub-system having graphical user interface for enabling user interaction and manipulation of system entities; and
   a server connected to the sub-system by a communication network having data repository for storing textual specifications and data particulars necessary for describing database intensive business application functionality and application development,
wherein the said sub-system having processor configured to execute programmed instructions for:
   (a) Defining two or more database intensive business application specifications as a single family of specifications with well defined commonality and well defined variability which is to be transformed into a concrete implementation on application architecture, wherein the application architecture is layered, with each layer representing one view of the system, comprising Graphical User Interface (GUI) layer, application logic layer and database (Db) layer;
   (b) Decomposing the family of database intensive business application specifications into three models comprising GUI layer model, Application layer model and Db layer model;
   (c) Modeling the family of specifications of database intensive business applications for one or more abstract views, wherein each distinct abstract view defines a set of properties corresponding to the layer and its their corresponding model;
   (d) Creating three meta models for each distinct abstract view, wherein the said meta models comprises GUI layer meta model, Application layer meta model and Db layer meta model;
   (e) Integrating each meta model to form single Unified meta model, wherein the single unified meta model allows to specify integrity constraints to be satisfied by the instances of related model elements within and across different layers, which enables independent transformation of GUI layer model, Application layer model and Db& layer model into their corresponding implementations GUI layer code, Application layer code and Db layer code into a consistent whole;
   (f) Selecting specific member of the tool-set family based on the desired criterion;
   (g) Transforming specification of either the whole application family or the desired family member using the desired tool-set so as to generate implementation for the whole family or the desired family member in to a consistent architecture; and
   (h) Generating suitable metadata for the family implementation to be configured to behave at application runtime, as any of its family members.

The invention provides a modeling of commonality and variability thus leading to a single database intensive business specification and it enables to create a common database intensive business application with a set of pre-defined variants, selection of a suitable variant from the pre-defined set, and composition of the common database intensive business application with the selected variant into a purpose-specific business database intensive application. The invention reduces the cost as well as computational time for creating new database intensive business applications, and leads to effective maintenance and smooth evolution.

The invention enables a model-based solution to enable extensibility and configurability of both structural and behavioral aspects in a functionality dimension of database intensive business application. And it also provides a component abstraction and an algebra that aids in imparting structural and behavioral properties of database intensive business application, and the component abstraction and the algebra are used to support the various adaptation operators in database intensive business application. The invention supports configuration process at three different stages of application development (i.e. design time, installation time and run time) of database intensive business application

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and system disclosed. In the drawings.

DETAILED DESCRIPTION OF THE INVENTION

Figure 1:
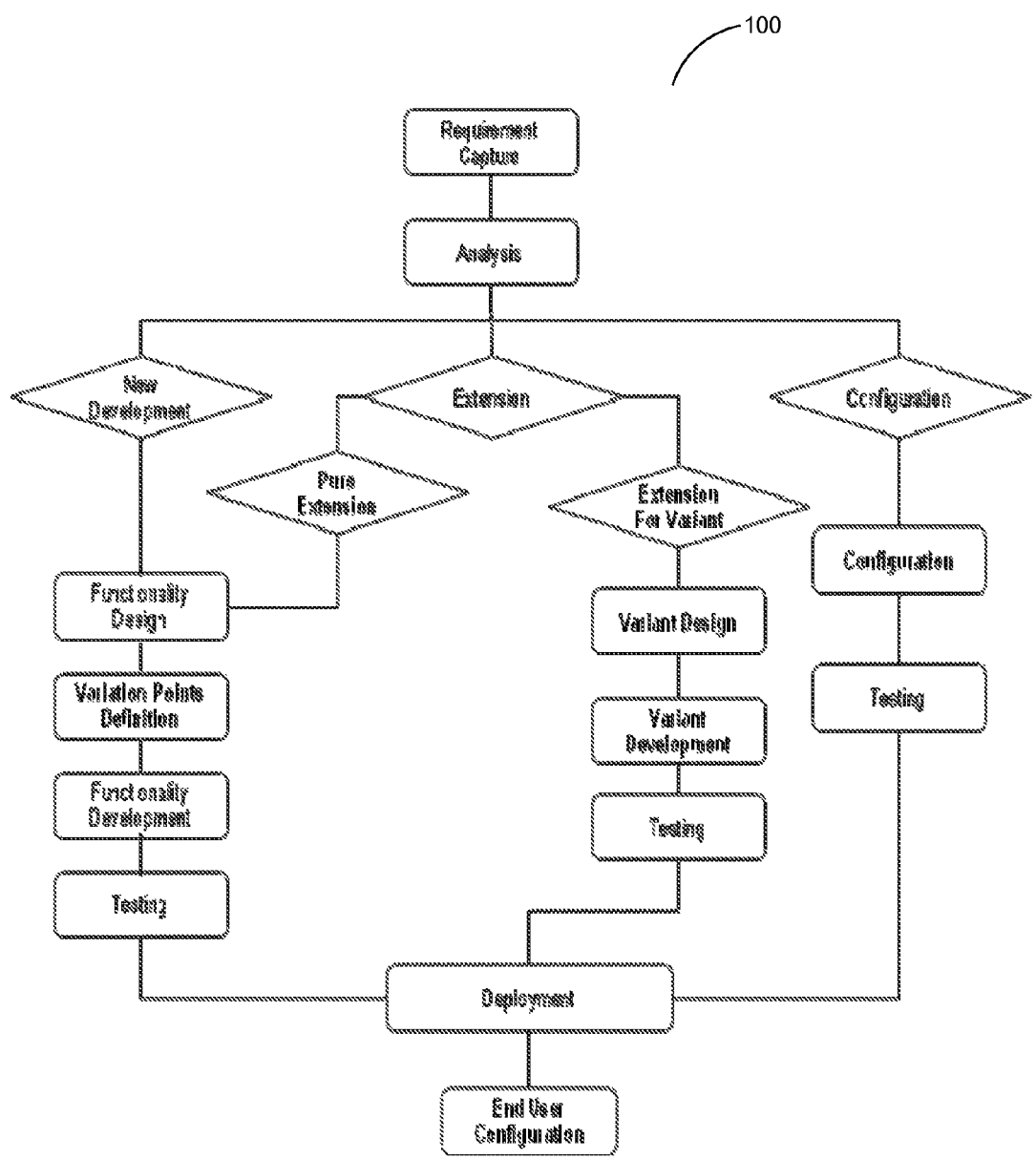
FIG. 1 shows flow Chart for database intensive business application Development Process according to various embodiments of the invention.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments of the present invention, the preferred methods, and systems are now described. The disclosed embodiments are merely exemplary of the invention, which may be embodied in various forms.

DEFINITIONS

Adaptiveness: When business application adapts to the application operating environment, wherein the adaptiveness subsumes configurability (i.e. selecting one of the many available variants) and extensibility (i.e. adding a new variant).

Variant: The different possibilities that exist to satisfy a variation point are called variants.

Variation Point: The variation point describes where differences exist in the final systems.

Variability dependencies: This is used as a basis to denote the different choices that are possible to fill a variation point. The dependency specification includes cardinality options like 1-of-n, m-of-n etc. and constraints like mandatory variants, mutually exclusively variants etc.

Configurability and Extensibility: Configurability means quick switching from one known situation to another and Extensibility mean easy handling of as yet unseen situation.

Different enterprises, from the same business domain for example banking sector, they want to open an account for financial transactions. They may have different requirements along with five dimensions {Functionality (F), Business process (P), Design decisions (D), Architecture (A) and Technology platform (T)} in the database intensive business application, so one can expect a significant overlap in their requirements and hence in specifications. Being ignorant of this overlap would mean rework, and result in specification redundancy which will create maintenance and evolution problems later. The present invention provides for modeling of commonality and variability thus leading to a single database intensive business specification.

Accordingly, the present invention enables creation of a common database intensive business application with a set of pre-defined variants, selection of a suitable variant from the pre-defined set, and composition of the common database intensive business application with the selected variant into a purpose-specific database intensive business application.

The present invention provides a computationally efficient system for developing configurable, extensible database intensive business application product lines using model-driven technique. By way of explanation and example, the present invention will be described in detail below using following system:

A computationally efficient system comprises: a sub-system having graphical user interface for enabling user interaction and manipulation of system entities, wherein the sub-system is a part of the main system and can be computational device such as computer, Laptop, etc; a server connected to the sub-system by a communication network for storing textual specifications and data particulars necessary for describing application functionality and application development, wherein the communication network can be selected at least one from the Local area Network (LAN), Wide Area Network (WAN), Internet, Intranet, telecommunication network, wherein the said sub-system having processor configured to execute programmed instructions for developing configurable, extensible database intensive business application product lines using model driven technique.

The above said computationally efficient system further comprises of at least one deployment framework for testing the developed database intensive business application, wherein the deployment framework comprises: the said sub-system having graphic user interface for enabling the user interaction with system; At least one server with Application Server installed on the system for residing developed database intensive business application and metadata; At least one server with Web Server installed on the system to route the user requests to the application server and one data repository to store application data.

FIG. 1 shows flow chart for database intensive business application development process (100) according to various embodiments of the invention. Initially, the sub-system captures the requirements of the client from the server and it analyzes the client's requirements. Based on analyzes, the sub-system having processor configured to execute programmed instructions for follows the below mentioned three ways, to develop a new database intensive business application, comprises New development, Extension, or Configuration. If the sub-system selects the new development of database intensive business application, then it does the functionality design, subsequently, it defines the variation points then it does the functionality development, subsequently tests the developed database intensive business application by using deployment framework and finally deploys the database intensive business application. If the sub-system selects extension, then it finds out whether pure extension or extension for variant. If it is pure extension then it leads to functionality designs, subsequently, it define the variation points then it does the functionality development, subsequently tests the developed database intensive business application by using deployment framework and finally deploys the database intensive business application. If it is extension for variant, then the sub-system does the variant design, variant development, subsequently tests the developed database intensive business application by using deployment framework and finally deploys the database intensive business application. If the sub-system selects configuration, then it tests database intensive business application by using deployment framework and finally deploys the database intensive business application. Once the deployment of the database intensive business application is done by the sub-system in the end user's/client's system. Finally, the client can use the developed database intensive business application in their system.

Figure 2:
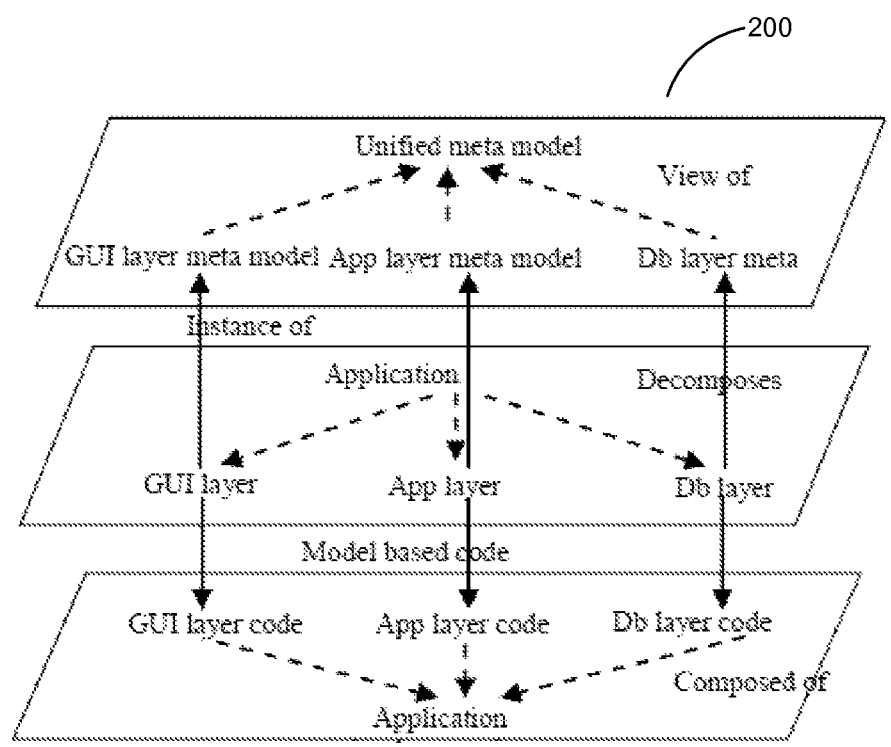
FIG. 2 illustrates model based database intensive business application development approach according to various embodiments of the invention.

FIG. 2 illustrates model based database intensive business application development approach (200) according to various embodiments of the invention. In the initial step of proposed model driven development approach of the system, the processor configured to execute the programmed instructions for defining two or more database intensive business application specifications as a single family of specifications with well defined commonality and well defined variability which is to be transformed into a concrete implementation on application architecture. The application architecture is usually layered with each layer representing one view of the system e.g. Graphical User Interface (GUI) layer, application logic layer and database (Db) layer. In the next step of the proposed approach, the processor configured to execute programmed instructions for decomposing the family of database intensive application specification into three such models—GUI layer model, Application layer model and Db layer model as shown in FIG. 2. In the next step of the proposed approach, the processor configured to execute the programmed instructions for constructing the family of database intensive business application specifications using one or more distinct abstract views, wherein each distinct abstract view defines a set of properties corresponding to the layer it models. In the next step of the proposed approach, the processor configured to execute programmed instructions for creating three meta models, namely GUI layer meta model, Application layer meta model and Db layer meta model, for the each distinct abstract views of specifications. In the next step of the proposed approach, the processor configured to execute programmed instructions for integrating each meta models to form a single Unified meta model as depicted in FIG. 2. Wherein the single meta model allows for specification of integrity constraints that need to be satisfied by the instances of related model elements within and across different layers. This enables independent transformation of GUI layer model, Application layer model and DB layer model into their corresponding implementations namely GUI layer code, Application layer code and Db layer code with assurance of integration of these code fragments into a consistent whole. These transformations can be performed either manually or using code generators. The transformations are specified at meta model level and hence are applicable for all model instances. In the next step of the proposed approach, the processor configured to execute programmed instructions for Selecting specific member of the tool-set family based on the desired criterion; and, the processor configured to execute programmed instructions for transforming specification of either the whole application family or the desired family member using the desired tool-set so as to generate implementation for the whole family or the desired family member in to a consistent architecture then Generating suitable metadata for the family implementation to be configured to behave at application runtime, as any of its family members, then the resulting implementations will go together giving a consistent implementation of the specification as depicted in FIG. 2. Models can be kept independent of implementation technology, and the application specifications can be targeted to multiple technology platforms through code generation. Construction of application specification in terms of independent models helps divide and conquer, wherein the divide and conquer strategy is explained in the FIG. 8. Modeling helps in early detection of errors in application development cycle. Associated with every model are a set of rules and constraints that define validity of its instances. These rules and constraints could include rules for type checking and for consistency between specifications of different layers. Automated code generation results in higher productivity and uniformly high code quality.

Figure 3:
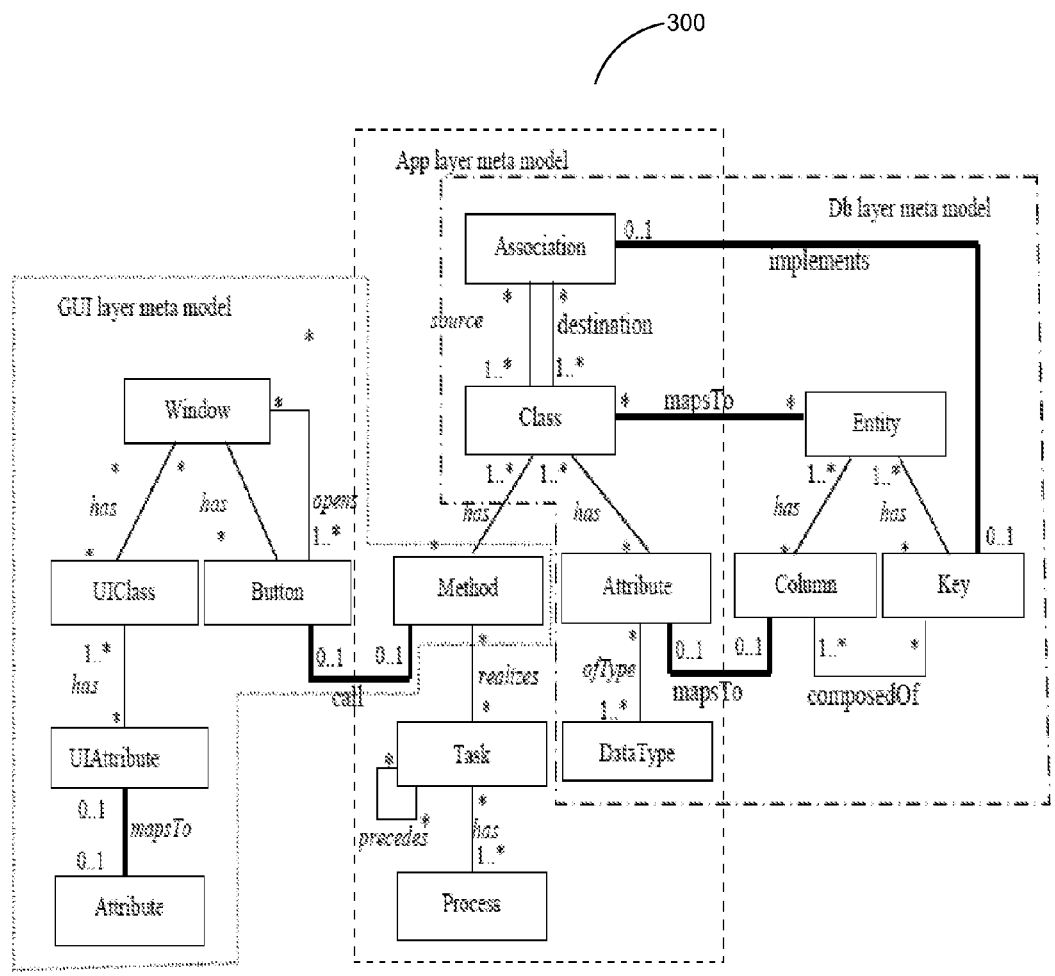
FIG. 3 illustrates meta models specific to each architectural layer as views of the unified meta model with the associations spanning across the architectural layer models of the database intensive business application according to one exemplary embodiment of the invention.

FIG. 3 illustrates meta models specific to each architectural layer as views of the unified meta model with the associations spanning across the architectural layer models (300) of the database intensive business application according to one exemplary embodiment of the invention. According to various embodiments of the invention, the system addresses extensibility and configurability of both structural and behavioral aspects of database intensive business application, wherein the meta models capture changes permissible to GUI model, application model and database model etc, and uses adaptation technique to effect the desired change into application implementation in a consistent manner. Database intensive business application is being implemented across three architecture layers—user interface, application functionality and database. The user interacts with an application through its user interface. The user feeds in information using forms and browses over available information using queries and reports. Forms, queries and reports are implemented in the application platform using standard graphical user interface primitives such as windows, controls and buttons. A window is a unit of interaction between the user and the system, and is composed of controls and buttons. A control accepts or presents data in a specific format. The user can perform a specific task by clicking on a button. Application layer implements the business functionality in terms of business logic, business rules and business process. The functionality is modeled using classes, attributes, methods and associations between classes. Business logic specifies the computations to be performed by the application in terms of methods. A higher level language for specifying business logic can free the application developer from low-level implementation concerns such as memory management, pointers, resource management etc and is retargettable to popular programming languages of choice. The database layer provides persistence for application objects using RDBMS tables, primary key and query based access to these tables, and an object oriented view of these accesses to the application layer.

Figure 4:
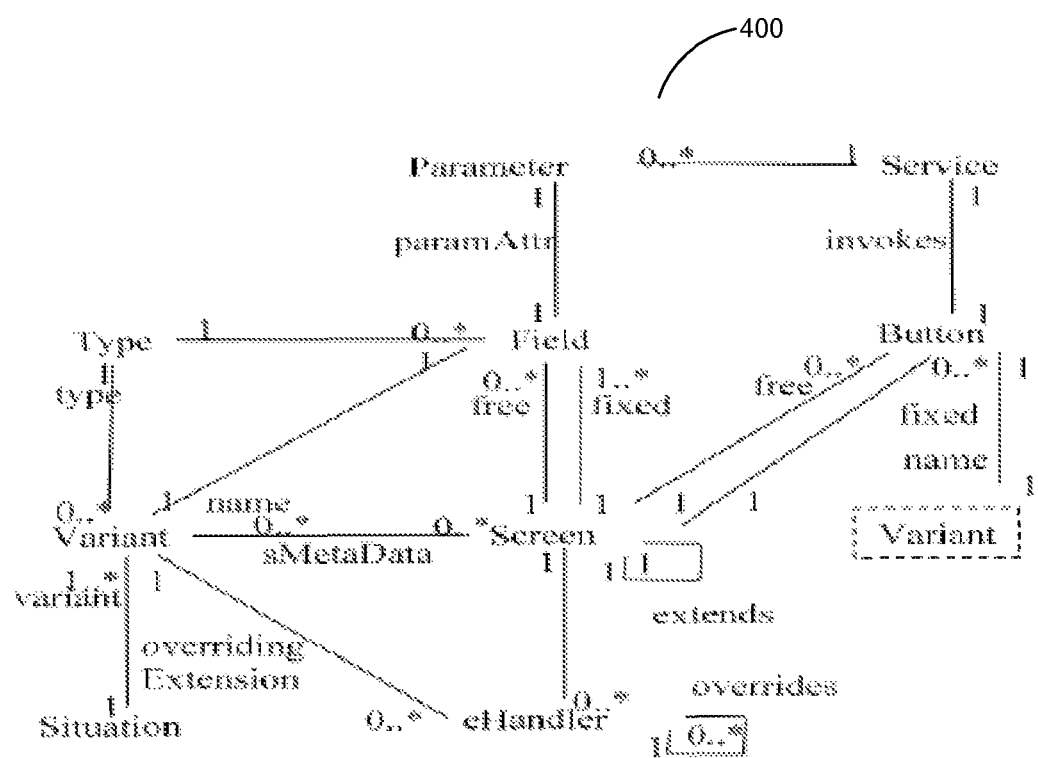
FIG. 4 shows meta model to address configurability and extensibility properties for user interface layer of the database intensive business application according to one embodiment of the invention.

FIG. 4 shows a meta model to address configurability and extensibility properties for user interface layer (400) of the database intensive business application according to one embodiment of the invention. A GUI screen is one of the channels for users to interact with an application. In essence, a GUI screen enables user to provide input data for carrying out a logical unit of work. To serve the same business intent, a GUI screen can vary in terms of what (i.e. data user needs to enter and/or can view) and how (i.e. layout information and GUI controls used for display) leading to multiple situations. Configurability means quick switching from one known situation to another, and extensibility means easy handling of as yet unseen situation. This meta model is an extension of user interface meta model highlighted in FIG. 3 as follows:

- Classification of fields into fixed and free. The former needs to be displayed in all situations whereas the latter are specific to a situation.
- Classification of buttons into fixed and free. The former needs to be displayed in all situations whereas the latter are specific to a situation.
- A field can be displayed using a different GUI control in different situations and can also conform to a different type.
- An event can be handled in different ways in different situations.
- A screen exists in multiple variants each an internally consistent composition of fields, buttons and event handlers.
- A situation helps select the desired variant of a screen from multiple alternatives.

Thus, the above meta model enables modeling of a family of screens wherein each member (of the screen family) serves the same intent in a specific situation. By making the above information available at application runtime, as metadata, a GUI implementation can switch from one known situation to another at application run-time. Addition of a new row in the metadata tables corresponds to ability of handling as yet unknown situation. Not all situational adaptations can be handled at application-runtime though, for instance, change in event handler code would need recompilation followed by redeployment. Similarly, definition of a new screen altogether, as an extension to existing functionality, cannot be handled at application run-time. But, the meta model enables a new situation to be addressed such that it adds to the existing set of configuration alternative.

Figure 5:
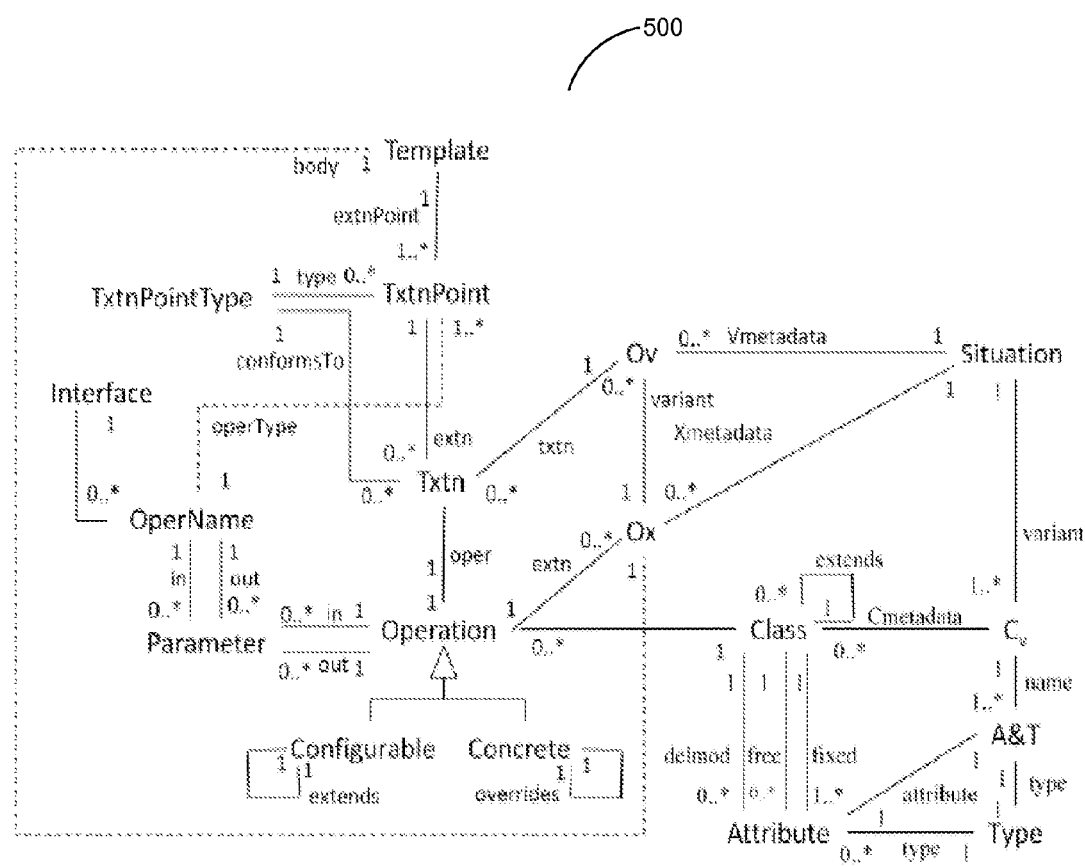
FIG. 5 depicts meta model for addressing configurability and extensibility properties for structural and behavioral aspects of application layer of the database intensive business application according to one embodiment of the invention.

FIG. 5 depicts meta model for addressing configurability and extensibility properties for structural and behavioral aspects of Application layer (500) of the database intensive business application according to one embodiment of the invention. Application layer specifies the business logic in terms of Class, Attribute and Operations. Being an encapsulation of both structural and behavioral aspects, Class is the natural choice for imparting configurability and extensibility at the finest level of abstraction. This meta model is an extension of the application layer meta model highlighted in FIG. 3 as follows:

- Classification of Attributes into fixed, free and delmod. A Class contains fixed attributes in all situations whereas free attributes are specific to a situation. Attributes tagged delmod represent situation specific deletions and/or modifications.
- An Attribute can conform to different types.
- Classification of Operations into Configurable and Concrete. The former have situation-specific behavior whereas the latter have constant behavior in all situations.
- Body of a Configurable operation is a Template with well-defined extension points (TxtnPoint) where different behaviors can be plugged in. An extension point is specified in the form of an interface invocation—a factory returns the appropriate object (Txtn) that implements the extension.
- Extending existing behavior amounts to providing a new extension (Ov) for existing extension points or defining a new template (Ox) for the operation being extended or both.
- Cv depicts situation-specific class definition.
- A situation helps select the desired variant of a class from multiple alternatives.

Thus, the above meta model enables modeling of a family of classes wherein each member (of the class family) serves the same intent in a specific situation. By making the above information available at application runtime, as metadata, application implementation can switch from one known situation to another at application run-time. Addition of a new row in the metadata tables corresponds to ability of handling as yet unknown situation. Not all situational adaptations can be handled at application-runtime though, for instance, addition of a new behavior extension (Ox or Ov) would need recompilation followed by redeployment. Similarly, definition of a new class altogether, as an extension to existing functionality, cannot be handled at application run-time. But, the meta model enables a new situation to be addressed such that it adds to the existing set of configuration alternative.

Figure 6:
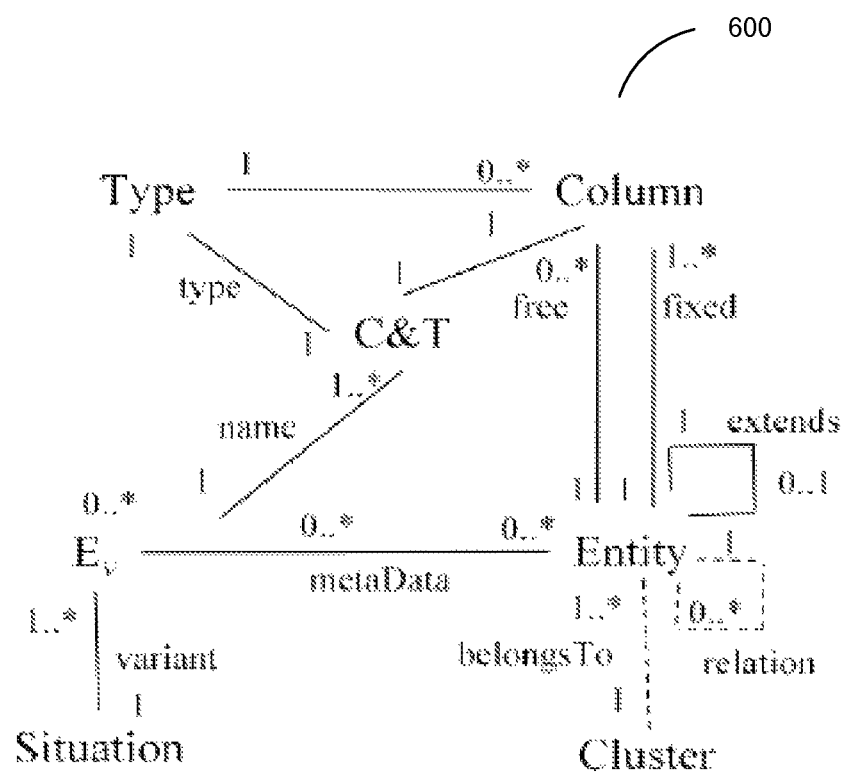
FIG. 6 shows meta model to address configurability and extensibility properties for database layer of the database intensive business application according to one embodiment of the invention.

FIG. 6 shows a meta model to address configurability and extensibility properties for database layer (600) of the database intensive business application according to one embodiment of the invention. Database layer provides persistency to the desired application objects. The system considers an object-relational database layer that provides an object façade to relational database tables for implementing persistence. As an application object can vary structurally from situation to situation, the database table onto which it maps also needs to cater to this variance. And the same holds for structural extension as well. This meta model is an extension of database layer meta model highlighted in FIG. 3 as follows:

- Classification of Columns into fixed and free. The former are associated with an Entity in all situations whereas the latter are specific to a situation.
- A Column can also conform to different types.
- Tv depicts situation-specific entity definition.
- A situation helps select the desired variant of an Entity from multiple alternatives.

Thus, the above meta model enables modeling of a family of entities wherein each member (of the entity family) serves the same intent in a specific situation. In essence, the above information makes the generic schema specific to a given situation. Database access methods such as primary key based Create, Update, Get and Delete, and complex data accesses like joins can encode interpretation of this information in their implementation. By making the above information available at application runtime, as metadata, application implementation can switch from one known situation to another at application run-time. Addition of a new row in the metadata tables corresponds to the ability of handling as yet unknown situation. Not all situational adaptations can be handled at application runtime though, for instance, deletion of a column would need redefinition of the schema leading to recompilation of database access layer code followed by redeployment. But, the meta model enables a new situation to be addressed such that it adds to the existing set of configuration alternative.

Figure 7:
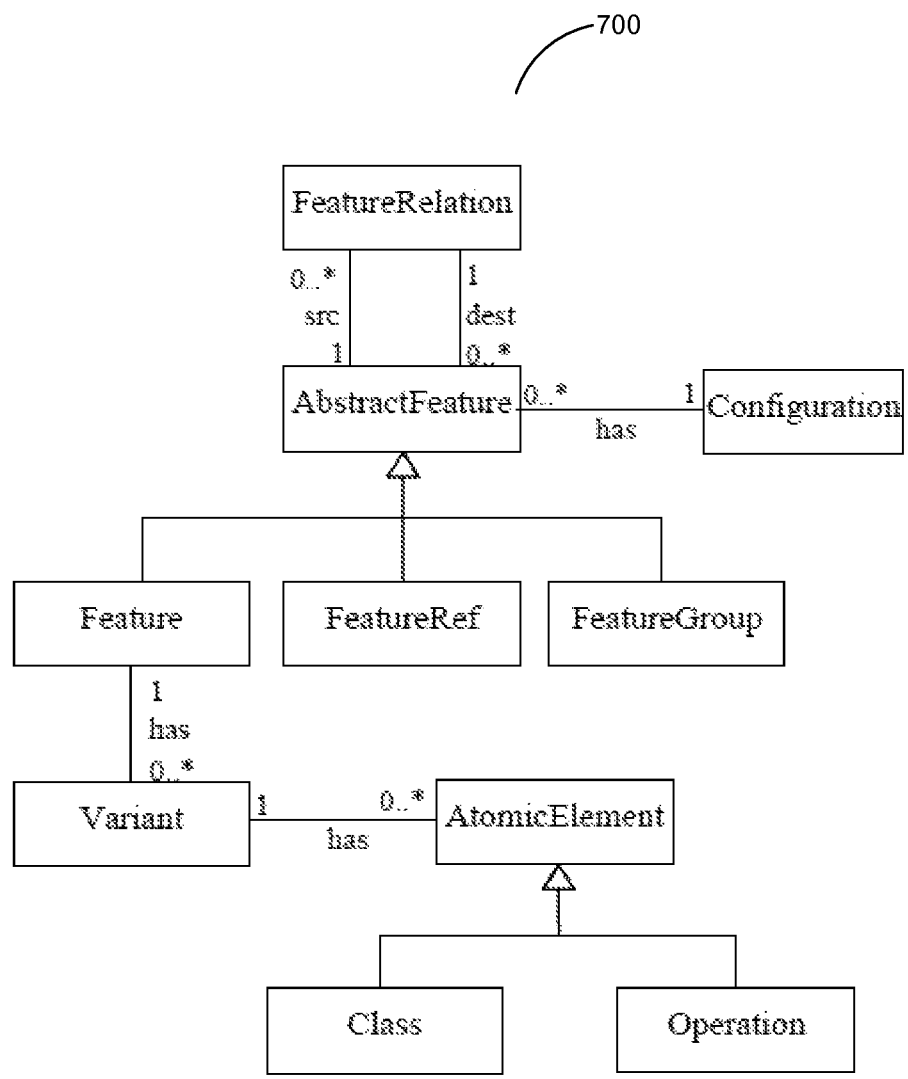
FIG. 7 shows relevant subset of a meta model to capture traceability of a feature to its implementation artefacts of the database intensive business application according to one embodiment of the invention.

FIG. 7 shows relevant subset of a meta model to capture traceability of a feature to its implementation artefacts (700) of the database intensive business application according to one embodiment of the invention. According to one embodiment of the invention, the processor the sub-system develops a common business application with a set of pre-defined variants, selection of a suitable variant from the pre-defined set, and composition of the common application with the selected variant into a purpose-specific business application. Meta models described above, in essence, help model a family at each architectural layer such that all members of a family share a common part and are distinguishable in terms of member-specific part. As described in FIG. 2, the unified meta model enables family of specifications of well-formedness constraints spanning across the architectural layers of the database intensive business application. Once a set of desired members, one from each architectural layer, is identified, it is possible to compose them into a well-formed specification that can be automatically transformed into a consistent and complete solution. The processor of the sub-system uses feature modeling technique to enable selection of a family member pertaining to the desired criterion.

Figure 8:
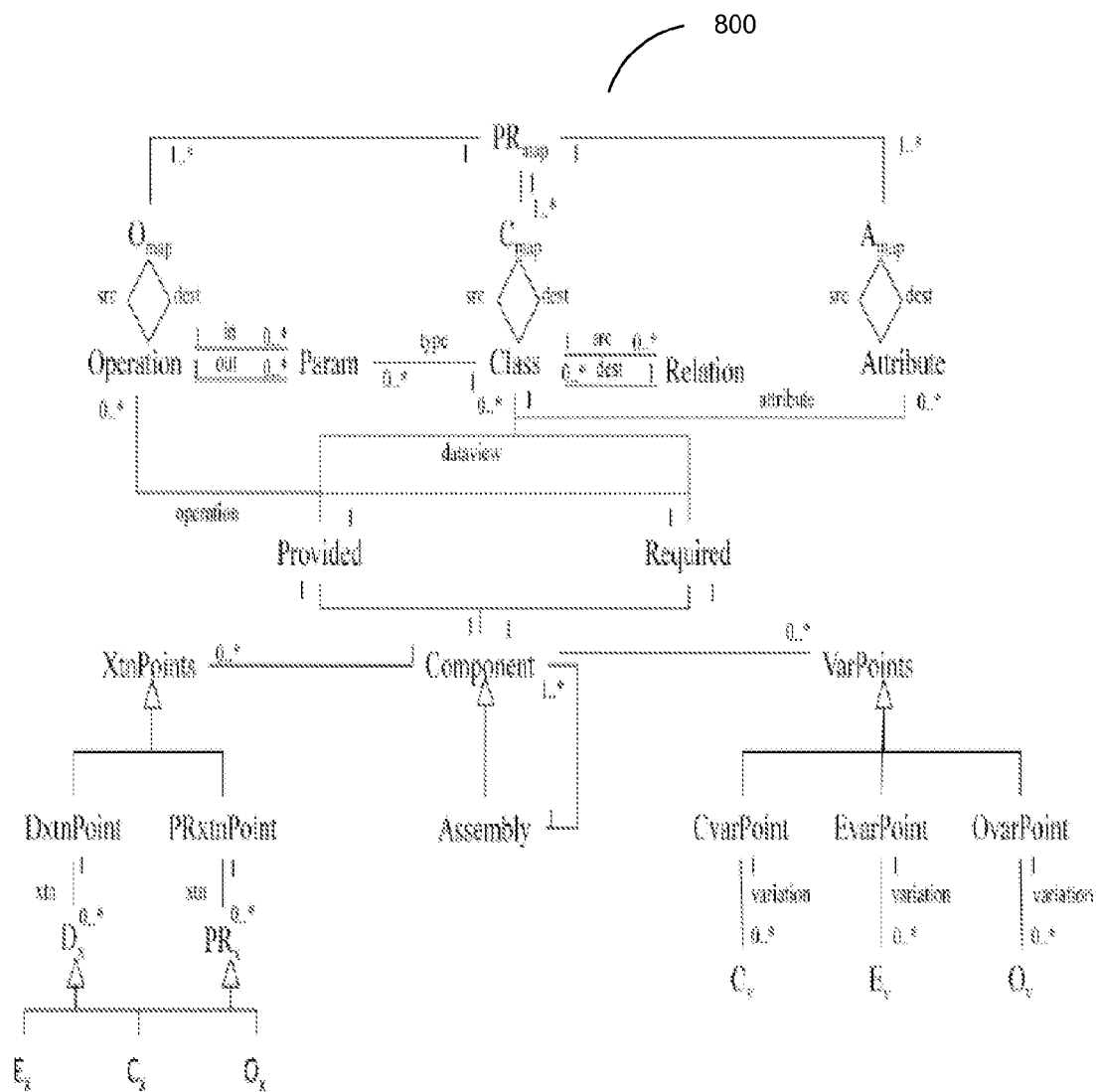
FIG. 8 shows the core meta model for the component abstraction of the database intensive business application according to one embodiment of the invention.

FIG. 8 shows the core meta model for the component abstraction (800) of the database intensive business application according to one embodiment of the invention. According to various embodiments of the invention, a component abstraction and an algebra that aids in imparting structural and behavioral properties of database intensive business application, and the component abstraction and the algebra are used to support the various adaptation operators in the database intensive business application. In a divide and conquer strategy, application is modeled as a set of modular units which can be developed in parallel. The processor of the sub-system considers such development unit as a component. Components share producer-consumer relationship amongst them. A component encapsulates data and computation, and exposes a set of services through its interfaces. Inter-relationship between components is a typical cause for tangled specifications that hamper independent development. The processor of the sub-system addresses tangling through separate specification of provided and required interfaces which serve as a contract between component and its environment. A component will deliver provided interface as long as its required interface is met by the environment. These are well accepted notions for application run-time, the component abstraction is aimed to support them at application build-time. The processor of the sub-system uses component abstraction to encapsulate business and database layers. A component specification comprises of interface specification as well as specification of its internal implementation. Essentially, internal implementation is specified in terms of classes, class associations, entities and specification of method-bodies of the classes. The component interface specification can be seen as a projection of its implementation specifications. Component, being a composition unit for applications, need to support the notions of configurability and extensibility. As shown in FIG. 8, the system extends the component abstraction through extension point (xtnPoints) and variation point (varPoints). Extension points are of two types: Data Extension Point (DxtnPoint) and Behavioral extension point (PRxtnPoint). Variation points are of three types: variation related to Entity (EverPoint), variation related to Operation (OverPoint) and variation related to Class (CvarPoint). Entity and Class extensions (Ex and Cx respectively) fit into DxtnPoint, and Operation and Class extensions (Ox and Cx respectively) can be plugged in at PRxtnPoint. Similarly, Entity and Class variations (Ev and Cv respectively) and Operation variations (Ov) can be plugged in at EverPoint, CvarPoint and OverPoint respectively.

The processor of the sub-system formally defines a component (Comp) as a tuple <Own, P, R, EO, ER, X, V> Where,
  Own: Component implementation specification, typically, as instance of a meta model
  P: Set Operations that a component provides.
  R: Set of Operations the component requires (so as to honour P).
  EO: Set of entities that component owns
  ER: Set of entities that component refers—owned by other components.
  X: Set of extensions for the component
  V: Set of variants of the component
  Operations are further defined as a tuple <operName, In, Out> where
  operName: Name of the operation
  In and Out are a set of typed parameters—type defined by a Class.
  Extension (X) is formally defined as tuple <Cx, Ex, Ox>, where,
  Cx identifies a set of extended classes as per a meta model pattern Cxp as mentioned in FIG. 5
  Ex identifies a set of extended entities as per a meta model pattern Exp as mentioned in FIG. 6
  Ox identifies a set of extended operation as per a meta model pattern Oxp as mentioned in FIG. 5
  Component variant (V) is defined as a tuple <Cv, Ev, Ov> where,
  Cv identifies a set of configurable Class variants as per a meta model pattern Cvp as mentioned in FIG. 5
  Ev identifies a set of configurable Entity variants as per a meta model pattern Evp as mentioned in FIG. 6
  Ov identifies a set of configurable Operation body variants as per a meta model pattern Ovp as mentioned in FIG. 5
  A component is well-formed if,
  P.Operation are realized as Class.Operation in Own, i.e.
  $\forall o \in$ Comp.P satisfies below condition
  $o \in \{$Comp.provided.interface[Operation]$\} \wedge (\exists$Class $c \in$Comp.Own|c.operation$=$o$)$
  R.Operation are expected to be implemented by Class.Operation of other component, i.e. $\forall o \in$Comp.R, satisfies below condition
  $o \in \{$Comp.required.interface[Operation]$\} \wedge (\exists$Class c|c.operation$=$o and c$\notin$Comp.Own$)$ The desired changes of an database intensive business application layer for a situation can be specified by instantiating class, entity, and operation meta models. Once the change is specified the next challenge is how to effect the changes in an application in a consistent manner. The processor of the sub-system characterizes a change as adding new situation and/or switching situation from one to another. The new situation can be realized by extending an application, composing or integration different application components into a consistent whole, whereas switching situation can be realized by selecting a valid set of components variations. The system provides a set of operators to effect the change with increased assurance of consistency in order to realize the changes those are described using different meta models and the set of set of operators comprises of extension operator, variation operator, or assembly operator. These operators are as follows:

Extension operator extends an existing component in terms of classes, entities, and operations as per extension patterns defined in as mentioned in FIGS. 4, 5 & 6.

Given a component Comp=<Own, P, R, EO, ER, X, V> and a component extension X=<Cx, Ex, Ox>, the resultant component CompR=Extend (Comp) is defined as $CompR.Own=Comp.Own \cup X$ $Comp_R.X.C_x=Comp.X.C_x \cup^n_{i=1}$ Extend $(Class_i) \cup$ Instantiate $(C_{xp}) \cup$ Instantiate $(O_{xp})$ $Comp_R.X.E_x=Comp.X.E_x \cup^n_{i=1}$ Extend $(Entity_i) \cup$ Instantiate $(E_{xp})$ $Comp_R.X.O_x=Comp.X.O_x \cup^n_{i=1}$ "Extend $(Operation_i)$ $Comp_R.P.O=Comp.P.Operation \cup provided(Comp_R.X.O_x)$
  where provided $(Comp_R.X.O_x)$
  $=\{\forall c.Operation \in Comp_R.X.O_x | c \in Comp.Own\}$ $Comp_R.R.O=Comp.R.Operation \cup required(Comp_R.X.O_x)$
  where required $(Comp_R.X.O_x)$
  $=\{\forall c.Operation \in Comp_R.X.O_x | c \notin Comp.Own\}$ $Comp_R.EO=Comp.EO \cup provided(Comp_R.X.E_x)$
  where provided $(Comp_R.X.E_x)$
  $=\{\forall e \in Comp_R.X.E_x | e \in Comp.Own\}$ $Comp_R.ER=Comp.ER \cup required(Comp_R.X.E_x)$
  where required $(Comp_R.X.E_x)$
  $=\{\forall e \in Comp_R.X.E_x | e \notin Comp.Own\}$ $Comp_R.V=Comp.V$ Variation operator adds a new variant for a component through addition of class, entity and/or operation variants. Given a component Comp <Own, P, R, EO, RO, X, V> and its existing variation V=<$C_v$, $E_v$, $O_v$>, addition of a new variation $V_{new}$ in Comp results into a component $Comp_R$, where $Comp_R$=Variation (Comp, $V_{new}$)

Such that $Comp_R.V=Comp.V \cup V_{new}$
  where $V_{new}.C_V$=Instantiate $(C_{vp})$
  $V_{new}.E_V$=Instantiate $(T_{vp})$
  $V_{new}.O_V$=Instantiate $(O_{vp})$ $Comp_R.D=Comp.D$ $Comp_R.P=Comp.P$ $Comp_R.R=Comp.R$ $Comp_R.X=Comp.X$ Well-formedness criteria for adding new variant in a component abstraction is:

$\forall a \& t \in C_v.name, \exists c \in Own.Class | c.free=a \& t.attribute$ and $c \in C_v.CmetaData$ $\forall c \& t \in E_v.name, \exists e \in Own.Entity | e.free=c \& t.column$ and $e \in E_v.metaData$ $\forall op \in O_v, \exists c \in Own.Class | c.operation.override=op$ Assembly operator assembles (composes) two or more components to result into a component that can further be assembled with other components.

Given Components $Comp_1$=<Own, P, R, EO, ER, X, V>, $Comp_2$<Own, P, R, EO, ER, X, V>, and P2R mapping relationship (a set of maps between provided and required interfaces and entities)

Interface map$^o$($Comp1.Operation_i \rightarrow Comp2.Operation_j$) is defined as (($Operation_i \in Comp_1.P$ and $Operation_j \in Comp_2.R$)
∧ $Operation_j.In \subseteq Operation_i.In$ ∧ $Operation_i.Out \subseteq Operation_j.Out$)
OR (($Operation_i \in Comp_1.R$ and $Operation_j \in Comp_2.P$)
∧ $Operation_i.In \subseteq Operation_j.In$ ∧ $Operation_j.Out \subseteq Operation_i.Out$)

Similarly entity map$^E$($Comp_1.entity_i \rightarrow Comp_2.entity_j$) is defined as ($entity_i \in Comp_1.EO$ and $entity_j \in Comp_2.ER$) OR
($entity_i \in Comp_1.ER$ and $entity_j \in Comp_2.EO$)

Then $Comp_R$=Assembly ($Comp_1$, $Comp_2$, P2R) is defined as $Comp_R.Own=Comp_1.Own \cup Comp_2.Own$ $Comp_R.P=Comp_1.P \cup Comp_2.P$ $Comp_R.R=Comp_1.R \cup Comp_2.R$−Resolved (P2R)

$Comp_R.EO=Comp_1.EO.own \cup Comp_2.EO$ $Comp_R.ER=Comp_1.ER \cup Comp_2.ER - Comp_R.EO$ $Comp_R.X=Comp_1.X \cup Comp_2.X$ $Comp_R.V=Comp_1.V \cup Comp_2.V$ Where, Resolved (P2R)=A set of operations, those satisfy the producer-consumer relationship between $Comp_1$ and $Comp_2$, i.e. $\{\forall o_i \in Comp_1.R \cup Comp_2.R |$
(($\exists o_j \in Comp_1.P \cup Comp_2.P$) ∧ map$^o$($o_i$, $o_j$)∈P2R ∧ ($o_i$ and $o_j$ does not belongs to same component))$\}$ According to various embodiments of the invention the system is capable of configuring the database intensive business application at stages comprising design, installation and run stage. The database intensive business application comprises of set of components each defined in terms of a set of classes, entities and operations. Therefore, variations of a database intensive business application can be seen along the meta objects component, class, entity and operation. Proposed meta models specify pre-defined variation points, possible variants, and constraints specifying consistent plugging-in of a variation point by of a variant. Configuration is a process of selecting appropriate variants so that all variation points are consistently plugged-in for an application. The system supports this configuration process of the database intensive business application at three different stages of application development: design time, installation time and run time. Design time configuration is supported through model transformation and model merge techniques. The installation time and run time configuration is supported by generating appropriate metadata for all possible variations—a configuration amounts to the metadata for the desired situation.

The invention is described in the example given below which is provided only to illustrate the invention and therefore should not be construed to limit the scope of the invention.

Different enterprises, from the same business domain for example banking sector, they want to open an account for financial transactions. They may have different requirements along with five dimensions {Functionality (F), Business process (P), Design decisions (D), Architecture (A) and Technology platform (T)} in the database intensive business application, so one can expect a significant overlap in their requirements and hence in specifications. Being ignorant of this overlap would mean rework, and result in specification redundancy which will create maintenance and evolution problems later. The present invention provides a computationally efficient system for developing configurable, extensible business application product lines using model-driven techniques and also provides for modeling of commonality and variability thus leading to a single specification.

Accordingly, the present invention provides for creation of a common business application with a set of pre-defined variants, selection of a suitable variant from the pre-defined set, and composition of the common application with the selected variant into a purpose-specific business application.

For example consider a scenario for developing a banking application with a core banking functionalities for different operating environments. We assume a banking application with core banking functionalities, e.g. opening account, deposit, withdraw, account transfer, need to be developed for different geographies, for example USA and India; and different sectors for each geography e.g. rural banks, public sector banks and private banks for Indian geography etc.

Though the application will appear the same to users in terms of functional content, its internal structure and behavior can differ from one operating environment to another, i.e. a large bank in USA, a private bank in India, and an Indian Rural bank. The invention refers to such differences as variability. Some scenarios and variability therein are listed below:

Typically, US banks use Social Security Number (SSN) as primary identification for customers whereas Permanent Account Number (PAN) is used for similar purpose by Indian private banks. On the other hand, Indian rural banks may use a combination of attributes e.g. customer name and mother's name as primary identification for a customer.

This leads to some variations in class and entity model for USA banks, Indian private banks, and Indian rural banks.

Layout of a screen to display customer details can be different for Indian private banks and Indian Rural Banks as mother's name should be present for rural banks and hidden for other banks.

This leads to different GUI model for Indian rural banks and other Indian banks.

The functionality of transferring money from one account to another account may differ for Indian rural bank, Indian private bank and USA bank as they follow different banking regulations.

The invention presents a method for specifying the above structural and behavioral variations leading to specifying an application family comprising of several related members—specification of each of which can be derived from the application family specification. Family members share a common core and differ from each other in a pre-defined way as listed above. In addition, members can evolve independently as dictated by the needs of their specific environment, for example, Indian private bank may decide to capture customer's marriage anniversary date as additional information in case of married customers. The concept extensibility described in this invention enables to specify these kinds of extensions as a new variant. Moreover, the method specified in this invention enables selection of the appropriate member of the family through a process of configuration. For example, a new USA bank can be configured with SSN number as primary customer identification number and customer's marriage anniversary date, which is present in Indian private bank, as additional field of customer details using suitable configuration.

Also, the invention reduces the computational cost as well as computational time for creating new business applications, and leads to effective maintenance and smooth evolution.

We claim:

1. A method for developing a plurality of database intensive business applications using a model based technique, the method comprising:

defining a single specification for a plurality of database intensive business applications to form a family of business applications, wherein the family of business applications comprises related members, wherein each of the related members share a common part, wherein each of the related members differ by a distinguishable part, wherein the common part is shared amongst related members, and wherein the distinguishable part is specific to a member, wherein the common part and the distinguishable part for a member are combined using a set of operators to define the single specification for the family of business applications;

dividing the single specification into three models, wherein each model corresponds to a layer of an architecture of a database intensive business application of the plurality of database intensive business applications, wherein the three models comprise a graphical user interface (GUI) layer model, an application logic layer model, and a database layer model;

creating a plurality of distinct abstract views for each layer of the architecture, wherein each distinct abstract view defines a set of properties for each layer;

creating three meta models for each distinct abstract view, wherein each meta model enables modeling of a family of a plurality of members at each layer, and wherein a member of the family comprises a common part and a distinguishable part, wherein the common part is shared amongst the plurality of members, and wherein the distinguishable part is specific to the member;

implementing the single specification for one or more members of the family into a source code for developing the plurality of database intensive business applications;

wherein the defining, the dividing, the creating, the creating a plurality of meta models, and the implementing are performed by a processor using programmed instructions stored in a memory.

2. The method of claim 1, further comprising integrating the three meta models to create a unified meta model, wherein the unified meta model specifies integrity constraints satisfied by one or more instances of the plurality of models.

3. The method of claim 1, wherein each layer comprises a Graphical User Interface (GUI) layer, an application logic layer, and a database (Db) layer.

4. The method of claim 1, wherein the three meta models comprise a GUI layer meta model, an application layer meta model and a Db layer meta model.

5. The method of claim 1, wherein the three meta models enable extensibility and configurability of structural and behavioral properties of the plurality of database intensive business applications.

6. The method of claim 1, wherein the three meta models capture changes permissible to the GUI layer meta model, the application layer meta model and the Db layer meta model.

7. The method of claim 1, wherein a meta model of the three meta models enables modeling of a family of screens, wherein each member of the family of screens serves a same business intent in a specific situation in the GUI layer.

8. The method of claim 1, wherein a meta model of the three meta models enables modeling of a family of classes, wherein each member of the family of classes serves a same business intent in a specific situation in the application logic layer.

9. The method of claim 1, wherein a meta model of the three meta models enables modeling of a family of entities, wherein each member of the family of entities serves a same business intent in a specific situation in the Db layer.

10. The method of claim 1, further comprising providing a component abstraction and an algebraic equation to implement structural and behavioral properties of the database intensive business application, wherein the component abstraction and the algebra support a plurality of adaptation operators in the database intensive business application.

11. The method of claim 1, further comprising configuring the database intensive business application at a design stage, an installation stage and a run stage.

12. The method of claim 1, further comprising generating a metadata for one or more variations of the database intensive business application for configuring the database intensive business application at the installation stage and the run stage.

13. The method of claim 1, wherein the set of operators comprises an extension operator, a variation operator and an assembly operator.

14. The method of claim 13, wherein the extension operator extends an existing component in terms of classes, entities and operations as per extension patterns defined in the GUI layer, the application logic layer and the Db layer.

15. The method of claim 13, wherein the variation operator adds a new variant for the existing component through addition of a class, an entity or an operation.

16. The method of claim 13, wherein the assembly operator assembles two or more components into a component, wherein the component is further assembled with one or more remaining components.

17. A system for developing a plurality of database intensive business applications using a model based technique, the system comprising:
   a memory;
   a processor coupled to the memory, the processor executes program instructions, stored in the memory, to:
      define a single specification for a plurality of database intensive business applications to form a family of business applications, wherein the family of business applications comprises related members, wherein each of the related members share a common part, wherein each of the related members differ by a distinguishable part, wherein the common part is shared amongst related members, and wherein the distinguishable part is specific to a member, wherein the common part and the distinguishable part for a member are combined using a set of operators to define the single specification for the family of business applications;
      divide the single specification into three models, wherein each model corresponds to a layer of an architecture of a database intensive business application of the plurality of database intensive business applications, wherein the three models comprise a graphical user interface (GUI) layer model, an application logic layer model, and a database layer model;
      create a plurality of distinct abstract views for each layer of the architecture, wherein each distinct abstract view defines a set of properties for each layer;
      create three meta models for each distinct abstract view, wherein each meta model enables modeling of a family of a plurality of members at each layer, and wherein a member of the family comprises a common part and a distinguishable part, wherein the common part is shared amongst the plurality of members, and wherein the distinguishable part is specific to the member; and
      implement the single specification for one or more members of the family into a source code for developing the plurality of database intensive business applications.

* * * * *